(No Model.)
C. F. PARKS & A. A. HAMILTON.
FENCE.
No. 526,500. Patented Sept. 25, 1894.
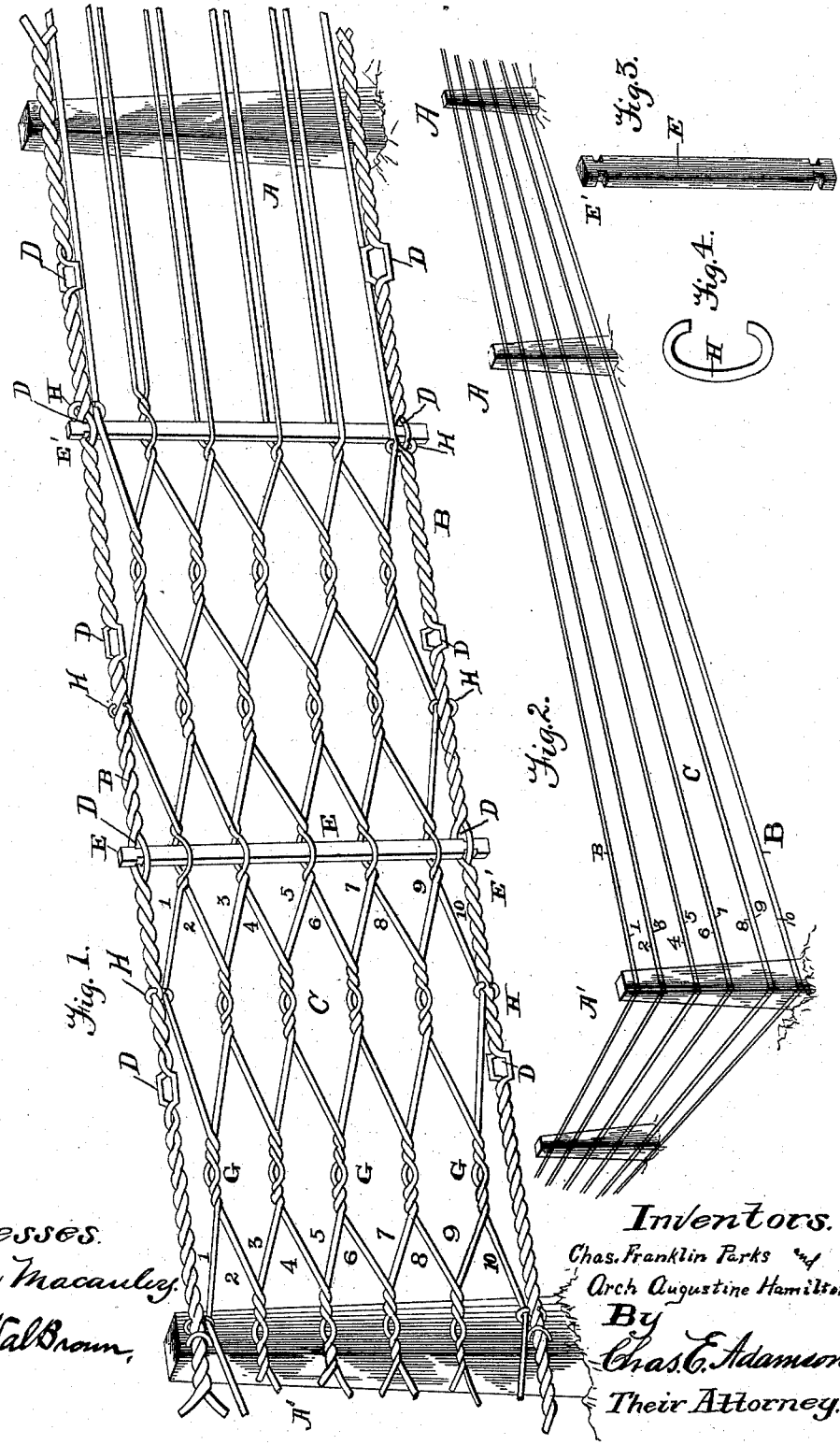
Witnesses.
Alvan Macauley
Wm DuVal Brown
Inventors.
Chas. Franklin Parks
Arch Augustine Hamilton
By
Chas. E. Adamson
Their Attorney.

UNITED STATES PATENT OFFICE.

CHARLES FRANKLIN PARKS AND ARCH AUGUSTINE HAMILTON, OF MUNCIE, INDIANA.

FENCE.

SPECIFICATION forming part of Letters Patent No. 526,500, dated September 25, 1894.

Application filed February 19, 1894. Serial No. 500,710. (No model.)

*To all whom it may concern:*

Be it known that we, CHARLES FRANKLIN PARKS and ARCH AUGUSTINE HAMILTON, citizens of the United States, residing at Muncie, in the county of Delaware and State of Indiana, have invented certain new and useful Improvements in Fences; and we do hereby declare the following to be a full, clear, and exact description of the invention, such as will enable others skilled in the art to which it appertains to make and use the same.

Our invention relates to improvements in fences, and the objects of our invention are to construct a cheap, simple and durable fence, and one that may be suitably designed for a farm or yard fence. We attain these objects by the mechanism illustrated by the accompanying drawings, in which—

Figure 1 is a perspective view of a panel of fence in the process of construction, showing two sections of the panels complete. Fig. 2 is a perspective of the posts and parallel wires before being woven together. Fig. 3 is a detail of one of the braces and Fig. 4 is a detail of one of the hooks.

Similar letters and figures refer to similar parts throughout the several views.

The first steps are to set the posts A A in line, a suitable distance apart, according to the purpose for which the fence is to be constructed and used. The top and bottom supporting cable wires B are then secured to the posts. The cable wires consist of two adjacent wires connected together by a right and left twist and having loops D formed at intervals. By this construction if the cables stretch loose they can again be tightened by giving the loops an additional twist. In every other loop a stay is inserted as hereinafter described. The netting wires C are then secured to the starting posts A' and consist of the top and bottom wires 1 and 10 arranged adjacent to and parallel with the cable wires and the parallel wires 2, 3, 4, 5, 6, 7 and 8 arranged in pairs. These wires are drawn out for some distance ahead, or far enough to keep out of the way of the weaving. The netting wires are woven together in a diamond form, forming hexagonal meshes in the following manner: First the top wire 1 is caught a few inches from the starting post to the second wire 2 and the two wires twisted together by giving the wires a double right and left twist leaving a loop or opening in the center of the twist so that they may be twisted again should they become loose. Then the third and fourth wires are caught and twisted in the same manner, then the fifth and sixth and so on down until the next to the bottom wire 9 is reached when it is twisted to the bottom wire 10 in the same manner as the wires 1 and 2 are twisted. After the wires have thus been twisted the top wire 1 is secured to the upper cable and the bottom wire 10 is secured to the lower cable by means of the detachable hooks or split rings H and the wires 2 and 3, 4 and 5, 6 and 7, and 8 and 9 are given a double right and left twist leaving a loop or opening so that they may be again twisted if they become loose. The wires 1 and 2 are then given a single right and left twist leaving a loop or opening in the center and the wires 3 and 4, 5 and 6, and 7 and 8 are then given a single right and left twist leaving a similar loop or opening in the center and the wires 9 and 10 are then twisted in the same manner as the wires 1 and 2. The stay E is then passed through the loop D in the upper cable and through the loops formed in the single right and left twist of the netting wires and then through the loop D in the lower cable.

The stays E are formed with notches E' near their ends. The loops D in the cable wires are adapted to engage in these notches, thereby holding the stays firmly in place. The wires are then twisted as first described and so on until the fence is completed.

Having thus described our invention, we claim the following and desire to secure the same by Letters Patent:

In a fence, the combination with the posts, of cable wires B connected by a right and left twist and having loops D formed in the twists, netting wires C woven together by right and left twists and forming elongated hexagonal meshes, stays E passing through every alternate loop in the cable wires B, having notches E' in which the cable wires engage, and passing through the twists in the netting wires and detachable hooks H for securing the top and bottom wires of the netting wires to the cable wires, substantially as described.

In testimony whereof we affix our signatures in presence of two witnesses.

CHARLES FRANKLIN PARKS.
ARCH AUGUSTINE HAMILTON.

Witnesses:
E. J. TOMLINSON,
E. E. DAUGHERTY.